United States Patent
Krumdick et al.

(10) Patent No.: US 9,263,769 B2
(45) Date of Patent: Feb. 16, 2016

(54) PROCESS FOR THE PRODUCTION OF LOW FLAMMABILITY ELECTROLYTE SOLVENTS

(71) Applicant: UCHICAGO ARGONNE, LLC, Chicago, IL (US)

(72) Inventors: Gregory K. Krumdick, Homer Glen, IL (US); Krzysztof Pupek, Plainfield, IL (US); Trevor L. Dzwiniel, Carol Stream, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 14/266,052

(22) Filed: Apr. 30, 2014

(65) Prior Publication Data

US 2015/0318574 A1 Nov. 5, 2015

(51) Int. Cl.
*C07F 7/18* (2006.01)
*H01M 10/0569* (2010.01)

(52) U.S. Cl.
CPC .. *H01M 10/0569* (2013.01); *H01M 2300/0028* (2013.01)

(58) Field of Classification Search
USPC .................................................. 556/470, 482
See application file for complete search history.

(56) References Cited

U.S. PATENT DOCUMENTS 5,157,139 A * 10/1992 Legrow et al. ................. 556/470
5,847,179 A * 12/1998 LeGrow et al. ............... 556/482

* cited by examiner

*Primary Examiner* — Sudhakar Katakam
*Assistant Examiner* — Pancham Bakshi
(74) *Attorney, Agent, or Firm* — Cherskov Flaynik & Gurda, LLC

(57) ABSTRACT

The invention provides a method for producing electrolyte solvent, the method comprising reacting a glycol with a disilazane in the presence of a catalyst for a time and at a temperature to silylate the glycol, separating the catalyst from the silylated glycol, removing unreacted silazane; and purifying the silylated glycol.

17 Claims, 4 Drawing Sheets

PROCESS FOR THE PRODUCTION OF LOW FLAMMABILITY ELECTROLYTE SOLVENTS

CONTRACTUAL ORIGIN OF THE INVENTION

The U.S. Government has rights in this invention pursuant to Contract No. DE-AC02-06CH11357 between the United States Government and UChicago Argonne, LLC, representing Argonne National Laboratory.

BACKGROUND OF THE INVENTION

1. Field of the Invention

This invention relates to a method for producing electrolyte solvents, and more particularly, this invention relates to an industrial scale method for producing electrolyte solvents.

2. Background of the Invention

The market for high power and high energy batteries continues to increase. However, the R&D for developing industrially scalable protocols is a barrier for many market participants.

Electrolytes are integral portions of batteries in that they shuttle charge to and from electrodes. A homogeneously mixed, well dispersed electrolyte facilitates efficient battery operation. Electrolyte solvents facilitate this homogeneity.

State of the art technology for preparing these solvents uses highly inefficient, multi-stage procedures requiring highly corrosive reagents. Further, a by-product is generated that requires additional processes to remove. Specifically, current methods for producing electrolyte solvents for lithium ion batteries require large amounts of flammable and peroxide-forming tetrahydrofuran (THF). (See Equation 1, below.) As a result, these methods use relatively large amounts of solvent for the reaction and workup to remove triethylammonium chloride byproduct. As such, time consuming, and multiple aqueous extractions of the product are necessary.

Equation 1

$$C_5H_{12}O_3 + Si(CH_3)_3Cl \xrightarrow{Et_3N, THF} C_8H_{20}O_3Si + Et_3NHCl$$

In Equation 1, 2-(2-methoxyethoxy)ethanol (molecular weight: 120.15 grams/mole) reacts with trimethylsilyl chloride in the presence of triethylamine and tetrahydrofuran to produce 2,2-dimethyl-3,6,9-trioxa-2-siladecane (molecular weight: 192.33 grams/mole) and triethylamine hydrochloride salt. The molecular structure of the reagents and products of Equation 1 can be seen in prior art FIG. 1.

Furthermore, state of the art methods require reaction times of more than 17 hours, which is not acceptable for scale-up protocols. For example, double distillations are necessary to achieve the electrolyte purity (approximately 99.5 percent) required by battery manufacturers.

Also, these methods require anhydrous solvents and reagents. These reactants need to be handled under inert atmospheres and protected from moisture.

Overall, state of the art processes generate large amounts of waste which need to be specially handled. Therefore, these processes are not economic.

A need exists in the art for a method for producing electrolyte solvent that allows its industrial scalability. The method should use nonproprietary reactants. The method should be run at relatively lower temperatures. Finally, the method should not require special atmospheres or handling.

SUMMARY OF INVENTION

An object of the invention is to provide a method for producing electrolyte solvent that overcomes many of the disadvantages of the prior art.

Another object of the invention is to provide a method for producing a solvent. A feature of the method is the use of catalyst. An advantage of the method is that the catalyst allows the method to be performed at lower temperatures (e.g., lower than 50 C) at shorter periods of time (e.g., less than 6 hours).

Yet another object of the invention is to provide a method for producing electrolyte solvent. A feature of the invention is that it requires no additional solvents. Another feature of the invented method is that it generates no organic byproducts, but rather, just ammonia is produced. An advantage of the method is that the process is scalable to industrial applications without the need for special inert atmospheres or materials handling. Another advantage is that the replacement of relatively lower flash-point solvents (such as carbonate solvents) for higher flash point ones (above about 38 C) results in electrolytes which are much less flammable than state of the art electrolytes, and therefore safer.

Still another object of the present invention is to provide a protocol to rapidly produce industrial scale quantities of electrolyte solvent. A feature of the present invention is its continuous flow nature whereby premixed reagents flow through a catalyst bed at a temperature, pressure and residence time sufficient to produce the solvent; after which the solvent is subjected to a continuous distillation step. An advantage of this feature is rapid continuous through put of the solvent.

Briefly, the invention provides a method for producing battery grade electrolyte solvent, the method comprising reacting a glycol with a disilazane in the presence of a catalyst for a time and at a temperature to silylate the glycol, separating the catalyst from the silylated glycol, removing unreacted silazane; and purifying the silylated glycol.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
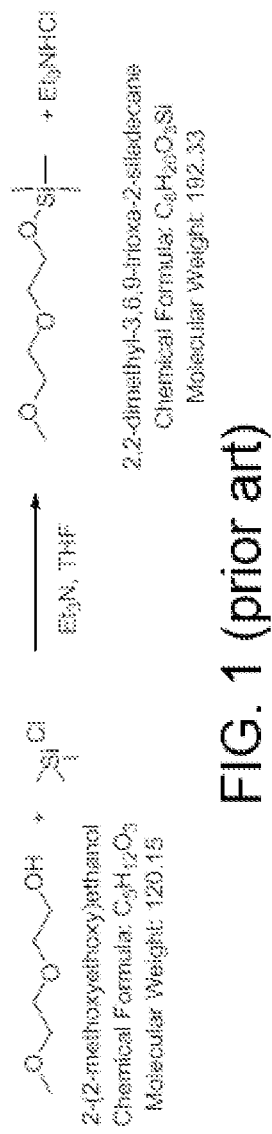
FIG. 1 is a prior art depiction of the molecular structure of the reagents and products of Equation 1.

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invented protocol enables the production of battery grade (e.g. greater than 99 percent pure, and preferably greater than about 99.5 percent pure) electrolyte solvents. For example, the invention enables the production of battery grade silylated polyethylene glycols for use as low flammability electrolyte solvents. Generally, per OSHA and DOT definitions, "flammable" liquid is that with a flash point below 100° F., while "combustible" liquid is that with a flash point above 100° F. The flash points of solvents produced via the invented method are between approximately about 150° F. and about 230° F. (i.e. about 65 C and about 110 C), whereas common commercial electrolyte solvents have flash points in the 60-80° F. range (i.e. about 15° C. and about 27° C.).

A salient feature of the invention is its ability to produce silylated glycols at reaction temperatures ranging from about 40 C to about 60 C, and at less than about 10 hours. An embodiment of the invention generates the glycols at reaction temperatures less than about 50 C and in less than about 6 hours.

A myriad of glycols are suitable, including generally oligoethylene glycol monoalkyl ethers having the general formula HO(CH2CH2O)$_x$OAlkyl, where x=2-5, Alkyl=1-8 carbon atom groups, including benzyl groups. Generally, diethylene glycol, triethylene glycol and tetraethylene glycol, and all common alkyl groups, methyl, ethyl, propyl, isopropyl, butyl, isobutyl, sec-butyl, pentyl, etc are suitable. Exemplary ethers include, but are not limited to, mono-alkyl ethers of oligoethylene glycols such as diethylene glycol monomethyl ether, triethylene glycol monomethyl ether, tetraethylene glycol monomethyl ether, diethylene glycol monoethyl ether, triethylene glycol monoethyl ether, tetraethylene glycol monoethyl ether, and combinations thereof.

Specifically, the method provides an improved, scalable process for the synthesis of the lithium-ion battery solvents, 2,2-dimethyl-3,6,9-trioxa-2-siladecane (flashpoint of about 160° F.) and 2,2-dimethyl-3,6,9,12-tetraoxa-2-silatridecane (flashpoint of about 224° F.). However, the process also can be utilized in the development of a catholyte in next generation flow batteries and in Li-air battery research.

Figure 2:
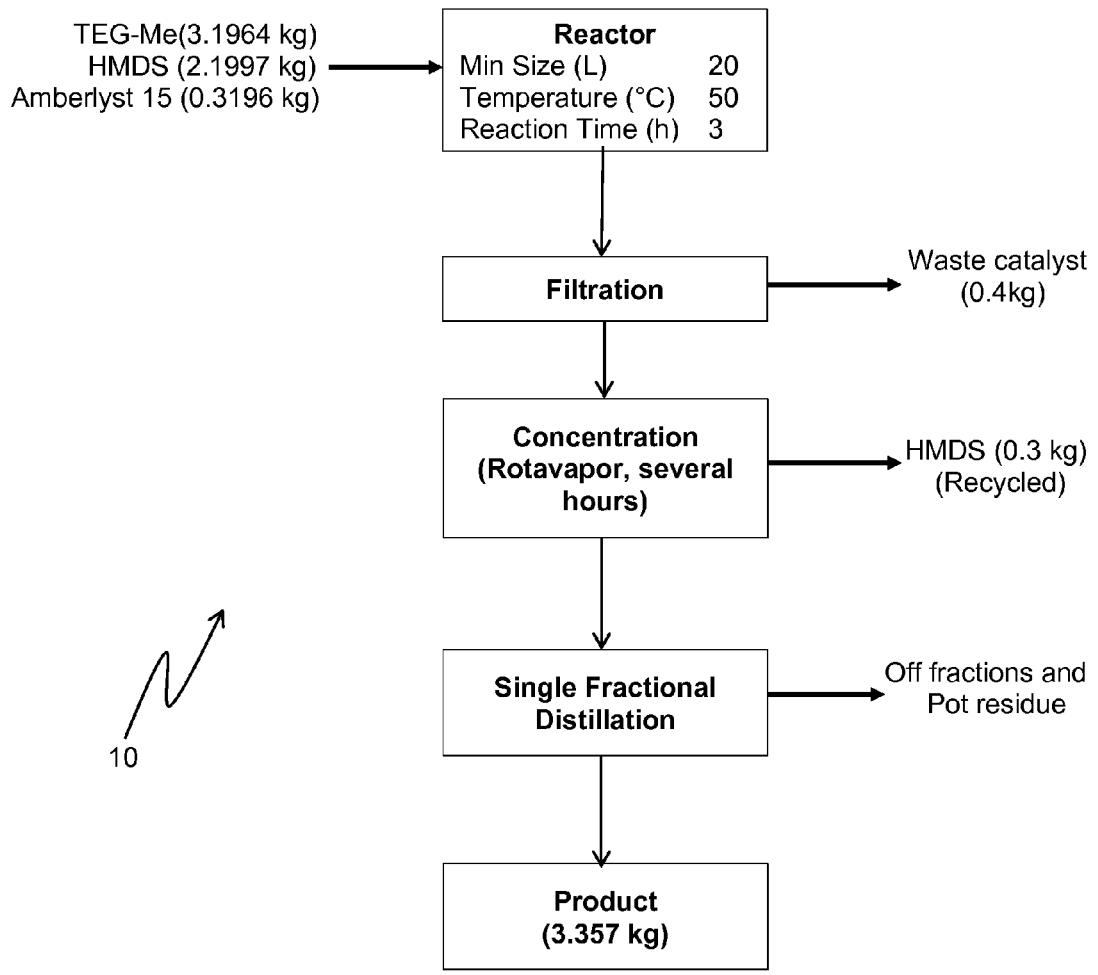
FIG. 2 is a flow diagram depicting a four step process for producing electrolyte solvent, in accordance with features of the present invention.

The invented method is depicted in flow chart form as numeral 10 in FIG. 2. It is a four step process from which industrial scale product quantities are generated. Industrial scale is dependant on the industry, but quantities between 10 and 100 kg are typical. The modularity of the process allows the quantities to be produced in multiples.

The invented method replaces two reagents triethylamine and chlorotrimethyl-silane with a single disilazane reagent. Suitable disilazane reagents include hexamethyldisilazane (HMDS), 1,3-diethyl-1,1,3,3-tetramethyldisilazane, 1,3-diallyl-1,1,3,3-tetramethyldisilazane, 1,3-diphenyl-1,1,3,3-tetramethyldisilazane, and combinations thereof. This reagent produces ammonia (see Equation 2, infra) as a byproduct instead of the corrosive HCl. (The HCl required triethylamine as a co-reagent in previous protocols.) An advantage of HMDS is its utilization in the invented protocol as both a reactant and a solvent, thereby eliminating the need of any additional solvents, and the concomitant extractions required downstream to remove those additional solvents.

A salient feature of the invented method is the use of a catalyst. The advantages of a catalyst are multifold and include a reduction in the reaction time of the process. In an embodiment of the invented protocol, use of catalyst decreased reaction time from 16 hours to about 3 hours. Also, a lower reaction temperature (below approximately 80° C.) is now achievable. The effects of these optimized reaction conditions is a reduction both in the amount of HMDS and catalyst loading.

Equation 2

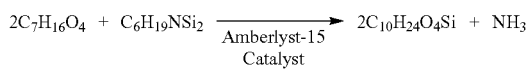

$$2C_7H_{16}O_4 + C_6H_{19}NSi_2 \xrightarrow[\text{Catalyst}]{\text{Amberlyst-15}} 2C_{10}H_{24}O_4Si + NH_3$$

Figure 3:
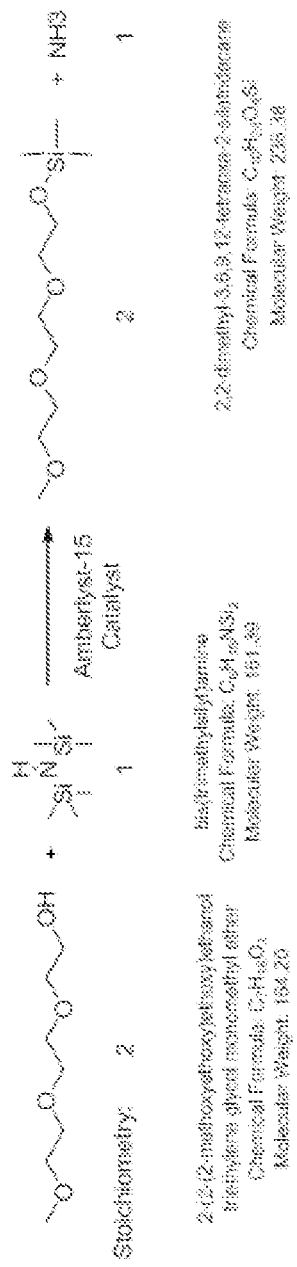
FIG. 3 depicts the molecular structure of the reagents and products of Equation 2.

In Equation 2, 2-(2-(2-methoxyethoxy)ethoxy)ethanol triethylene glycol monomethyl ether (molecular weight: 164.20 grams/mole) reacts with bis(trimethylsilyl)amine (molecular weight 161.39 grams/mole) in the presence of Amberlyst®-15 catalyst to produce 2,2-dimethyl-3,6,9,12-tetraoxa-2-silatridecane (molecular weight 236.38 grams/mole) and ammonia. The molecular structure of the reagents and products of Equation 2 can be seen in FIG. 3.

Finally, the work-up procedure is greatly simplified with a single filtration step to remove the catalyst. Ammonia byproduct is removed during the reaction.

An embodiment of the invented method produces an electrolyte solvent 2,2-dimethyl-3,6,9-trioxa-2-siladecane. The method produces the solvent in about one-fourth the time now required in the prior art. Furthermore, the method generates no waste streams requiring elaborate disposal. An embodiment of the invented method is depicted in Equation 2.

Figure 4:
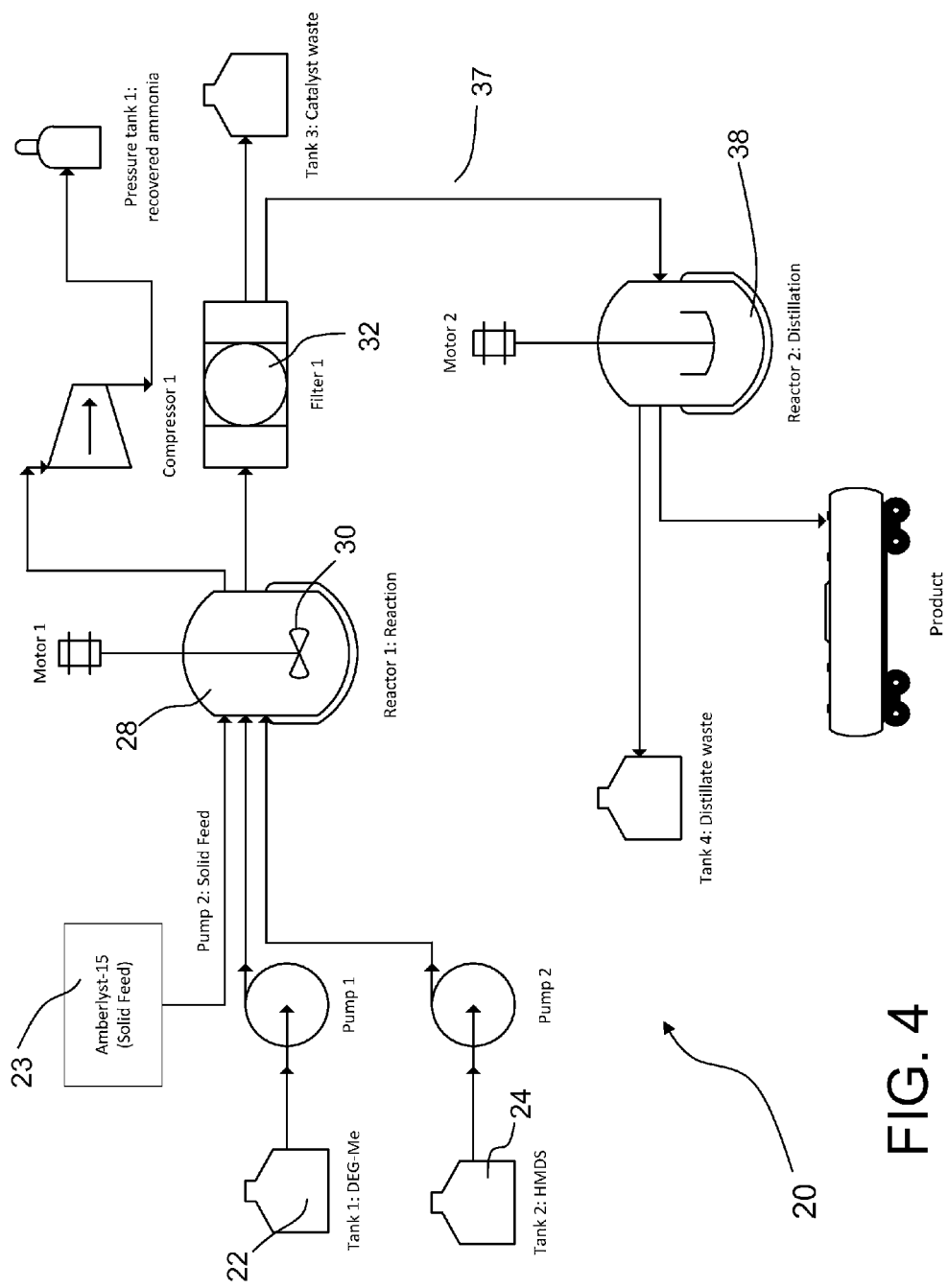
FIG. 4 is a schematic diagram depicting a process for producing electrolyte solvent, in accordance with features of the present invention.

A myriad of weight percents and temperatures are suitable to practice the industrial scale solvent production protocol depicted as numeral 20 in FIG. 4. Generally the reactor 28 is charged with di- or tri-ethylene glycol monomethyl ether 22 (1.0 eq) and 1,1,1,3,3,3-hexamethyldisilazane 24 (Range of 0.5 to 1.5, preferred 0.55 to 0.9, most preferred 0.65 to 0.75 eq). Suitable catalyst 23, such as Amberlyst-15 (Range of 0.5 to 30%, preferred 2 to 20%, most preferred 5-15%) is added to the reactants prior to introduction into the reactor 28.

Alternatively, the reactants are combined first, and then injected into the reactor. For example, the glycol and hexamethyldisilazane can be combined earlier. In an example of this embodiment of the invented protocol, the two reactants are pumped into a mixing chamber, mixed there, then forwarded to the reactor.

The stirring speed was set to keep the catalyst suspended. The circulator 30 was set to control the process (internal reaction mixture) to a temperature of (range of about 20 to about 140° C., preferred about 30 to about 80° C., most preferred about 40 to about 60° C. The reaction was followed by gas chromatography.

The reaction mixture was cooled to 20 C. The contents of the reactor were drained onto a substrate having a porosity suitable to separate the solid catalyst from the product. Any inert filter substrate is appropriate, as porosity will vary with the aggregate size of the catalyst utilized. For example, in an embodiment of the invention, catalyst carrier beads of between about 600 and 800 microns in diameter can be separated on a medium glass frit. Other glass frits are also suitable and typically have porosities varying from 4-6 microns (fine), to 10-20 microns (medium) to 40-600 microns (coarse) porosity.

The filtrate was concentrated under reduced pressure on a Buchi rotary evaporator 38. The excess HMDS was recovered. The reactor 28 was cleaned and charged with the concentrate.

Ultimately, the final product 37 separated from the recycled catalyst and unreacted reagents was fractionally distilled 38 to a purity greater than 99 percent. Surprisingly and unexpectedly, the inventors found battery grade purity (e.g. about 99.5 percent is achieved after a single distillation step 38.

Figure 5:
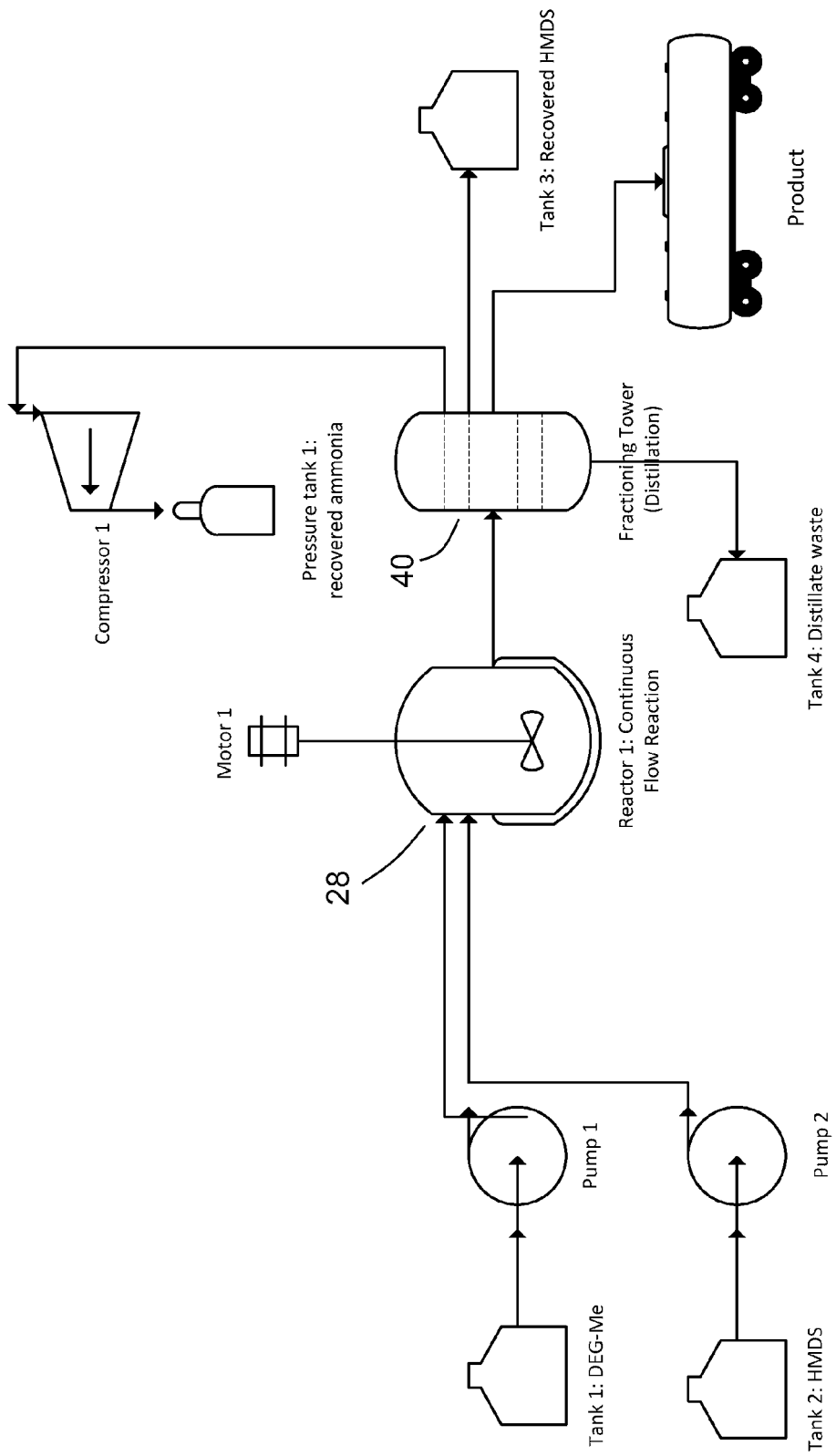
FIG. 5 is a schematic diagram depicting a process for continuously producing electrolyte solvent, in accordance with features of the present invention.

While a single reactor 28 protocol has been described supra to generate the low flammability solvent, another reactor paradigm is envisioned to enable continuous production of solvent. An example of that paradigm is depicted in FIG. 5. A salient feature of this continuous production paradigm is that the catalyst remains in the reactor 28. In one embodiment, the catalyst is immobilized within a region of the reactor, so as to be fluidized within that region.

The continuous production configuration depicted in FIG. 5 enables a continuous flow of reagents into the reactor and continuous flow out of the reactor to contact a fractionating column 40. Different outputs of the tower are collected for subsequent use.

There are a number of silylation catalysts to effect general silylations of alcohols and phenols, those catalysts including boric acid, montmorillonite clays, ammonium sulfate, trimethylamine hydrochloride, zinc bromide, copper sulfate, lithium bromide, copper bromide, Nafion support, zinc chloride, toluene sulfonic acid, trifluoroacetic acid, triflic acid, sulfuric acid, zeolytes, iodine, sodium iodide, potassium bromide, and bismuth triflate. However, inasmuch as a primary objective was to produce a protocol for ease of use and separation, preferred specific solid catalyst species and their efficiencies are listed in Table 2, infra.

Italicized numbers are at 50° C., all others at ambient (20° C.) temperature.

EXAMPLE 1

Preparation Detail for
2,2-dimethyl-3,6,9-trioxa-2-siladecane

A glass reactor (20 L, jacketed, Chemglass) equipped with drain valve, internal temperature probe, reflux condenser, gas inlet/outlet adapters and powder port was flushed with nitrogen. The jacket of the reactor was connected to a Huber 430 heating/chilling circulator. The gas outlet port was connected to a scrubber consisting of 10 L water in a polypropylene drum.

The reactor was charged with diethylene glycol monomethyl ether (7500.2 g, 62.42 mol, 1.0 eq, Aldrich lot MKBH7053V) and 1,1,1,3,3,3-hexamethyldisilazane (5544.3 g, 34.33 mol, 0.55 eq, Alfa lot F21Y010) Add Amberlyst-15 catalyst (375.6 g, 5 wt %, Aldrich lot MKAA0578).

The stirring speed was set to 120 rpm to keep the catalyst suspended. The circulator was set to control the process (internal reaction mixture) by slowly ramping the temperature up to 50° C. The reaction was followed by GC/FID (Agilent HP-5MS, 0.25 um, 30 m×0.250 mm, 30 deg/min), taking samples at 1 hour intervals. The reaction was determined to be complete at 50° C. after 3 hours.

The reaction mixture was cooled to 20 C. The contents of the reactor were drained onto a glass frit (medium porosity). The filtrate was then returned to the cleaned and dried 20 L reactor. The material was fractionally distilled using a 5 plate Oldershaw column. Once initial fractions were taken, the remainder of the crude material (and off-fractions) were transferred to a 5 L reactor and re-distilled using a 15 plate Oldershaw column. The reactor jacket temperature was set to 125° C., the pressure was set to 60 mbar, and the condenser temperature was set to 11° C. The distillation temperature measured at the top of the column was 115-116° C. for pure fractions.

Yield 9715 g (80.9%) of 2,2-dimethyl-3,6,9-trioxa-2-siladecane (ANL-1NM2). GC/FID purity: 99.917 (average of 3 injections). GC/MS purity: 99.979 (average of three injections).

EXAMPLE 2

Preparation Detail for
2,2-dimethyl-3,6,9,12-tetraoxa-2-silatridecane

A glass reactor (20 L, jacketed, Chemglass) equipped with drain valve, internal temperature probe, reflux condenser, gas

TABLE 2

Solid catalyst Activity Comparisons

| Catalyst | Time, amt HMDS | | | | | |
|---|---|---|---|---|---|---|
| | 6 h 0.7 eq | 24 h 0.7 eq | 6 h 0.6 eq | 24 h 0.6 eq. | 5 h 0.8 eq. | 21 h 0.8 eq. |
| 1 wt % Nafion SAC-13 | 36.49 | 93.27345 | 27.73908 | 76.5564 | 33.44 | 92.42 |
| 1 wt % MMT K10 | 17.98 | 44.92492 | 15.2715 | 49.23309 | 19.62 | 51.87 |
| 5 wt % Nafion SAC-13 | 95.68 | 100 | 63.66239 | 100 | 84.23 | 99.59 |
| 5 wt % MMT K10 | 20.06 | 70.11615 | 21.86058 | 60.45144 | 39.21 | 68.95 |
| 0.5 wt % Nafion SAC-13 | 28.05 | 74.62353 | 19.63262 | 76.51206 | 44.19 | 91.13 |
| 5 wt % MMT K30 | | | 20.52355 | 64.14997 | 25.76 | 75.97 |
| 1 wt % Amberlyst | *49.78* | *83.15* | 14.08 | 61.78 | 14.73 | 74.00 |
| 5 wt % Amberlyst | *93.88* | *100* | 26.82 | 95.33 | 23.97 | 100.00 |
| 10 wt % Amberlyst | *100* | *100* | 40.5 | 99.73 | 39.91 | 100.00 | inlet/outlet adapters and powder port was flushed with nitrogen. The jacket of the reactor was connected to a Huber 430 heating/chilling circulator. The gas outlet port was connected to a scrubber consisting of about 4 L water in a polypropylene drum.

The reactor was charged with triethylene glycol monomethyl ether (3196.4 g, 19.47 mol, 1.0 eq, TCI lot FGI01) and 1,1,1,3,3,3-hexamethyldisilazane (2199.7 g, 13.6 mol, 0.07 eq, Alfa lot H09W015 (1935.4 g) and lot 10151582 (264.3 g)). Add Amberlyst-15 (319.6 g, 10 wt %, Aldrich lot MKBD4929).

The stirring speed was set to 80-95 rpm to keep the catalyst suspended. The circulator was set to control the process (internal reaction mixture) by slowly ramping the temperature up to 50° C. The reaction was followed by GC/MS (Agilent HP-5MS, 0.25 um, 30 m×0.250 mm, 30 deg/min). The first sample was taken at 1 hour after reacting temperature and indicated complete consumption of starting triethylene glycol monomethyl ether. The reaction was held at 50° C. for a total of 3.5 hours.

The reaction mixture was cooled to 20 C. The contents of the reactor were drained onto a glass frit (medium porosity). The filtrate was concentrated under reduced pressure on a Buchi rotary evaporator (R-215, bath temperature 55 C, pressure 1-3 mbar). The HMDS was recovered (274 g). The remaining concentrate weighed 4614 g.

The 5 L reactor was cleaned and charged with most of the concentrate (3033 g). The material was fractionally distilled using a 5 plate Oldershaw column. Once initial fractions were taken, the remainder of the crude material (and off-fractions) were added back and re-distilled. The reactor jacket temperature was set to 125° C., the pressure was set to 3.5 mbar, and the condenser temperature was set to 15° C. The distillation temperature measured at the top of the column was 107-109 for pure fractions.

Yield 3357 g (73%) of 2,2-dimethyl-3,6,9,12-tetraoxa-2-silatridecane (ANL-1NM3). Purity 100% (average GC/MS peak area integration). No other peaks were detected above baseline noise. Moisture 26 ppm (per KF coulometric titration). Flash point (closed cup) 112.5° C. Table 3 provides the process parameters of this Example.

TABLE 3

Process Schematic Parameters (29 kg Modified Route)

| | Amount (kg) | Capacity (L) | Rate (L/h) | Temp (° C.) | RPM |
|---|---|---|---|---|---|
| Solid Feed 1: Amberlyst | 16.17 | | | | |
| Tank 1/Pump 1: TEG-Me | 161.68 | | ND | | |
| Tank 2/Pump 2: HMDS | 111.24 | | 200 | | |
| Reactor 1 | | 400 | | 20-90 | |
| Motor 1 | | | | | 0 to 125 |
| Filter 1 | | 50 | | | |
| Solid Waste tank | 20 | 50 | | | |
| Compressor 1 | | | | | |
| Pressure Tank 1: $NH_3$ | 16.74 | 30 | | | |
| Reactor 2 | | 400 | | 10-150 | |
| Motor 2 | | | | | 0 to 150 |
| Tank 4: Distillate waste | 89 | 100 | | | |
| Product: ANL-1NM3 | 163 | | | | |

In operation, three siloxane based electrolytes were solvated with solvent produced by the invented protocol. NCM111 (cathode) and A12 graphite (anodes) electrodes were tested.

A solid electrolyte interphase (SEI) formation step was observed during the first charge process. Then, low coulombic efficiency was obtained during first discharge process.

HPPC results indicated that all the electrolytes had higher resistance compared to the conventional carbonate based electrolyte. Accordingly, the cells showed same trend in rate performance: higher impedance, lower rate performance, that is seen in electrolytes solvated in solvent produced via conventional protocols.

At C/3 rate, the cells with siloxane based electrolyte showed good cycle performance. A feature of these siloxane based electrolyte are their relatively lower flammability compared to the other electrolytes produced.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiments of the invention in which an exclusive property or privilege is claimed is defined as follows:

1. A continuous method for producing battery grade electrolyte solvent, the method comprising:

a. reacting a glycol with a disilazane in the presence of a catalyst in a reactor for a time and at a temperature to silylate the glycol;
b. separating the catalyst from the silylated glycol wherein the catalyst remains in the reactor;
c. removing unreacted silazane; and
d. purifying the silylated glycol, wherein the method is conducted without an inert atmosphere.

2. The method as recited in claim 1 wherein the reacting step comprises combining the glycol with the disilazane and the catalyst in a reactor.

3. The method as recited in claim 1 wherein the time is selected from between about 2 and about 6 hours.

4. The method as recited in claim 1 wherein the temperature is selected from between about 30° C. and about 70° C.

5. The method as recited in claim 1 wherein the catalyst is a solid catalyst selected from the group consisting of Amberlyst, Nafion, Montmorillonite, and combinations thereof.

6. The method as recited in claim 1 wherein the catalyst is solid and the catalyst is separated from the silylated glycol by simple particle filtration.

7. The method as recited in claim 2 wherein the unreacted silazane is returned to the reactor.

8. The method as recited in claim 1 wherein the silylated glycol is purified in a single fractional distillation.

9. The method as recited in claim 1 wherein the silylated glycol is more than 99.5 percent pure.

10. The method as recited in claim 1 wherein the glycol is a polyethylene glycol selected from the group consisting of alkyl ethers of $HO(CH_2CH_2O)_xOAlkyl$, where $x=2-5$, Alkyl=group of 1-6 carbon atoms.

11. The method as recited in claim 1 wherein no solvent is utilized.

12. The method as recited in claim 1 wherein the only waste product is ammonia.

13. The method as recited in claim 1 wherein the glycol is 2-(2-methoxyethoxy)ethanol and the silylated glycol is 2,2-dimethyl-3,6,9-trioxa-2-siladecane.

14. The method as recited in claim 1 wherein the glycol is 2-(2-(2-methoxyethoxy)ethoxy)ethanol and the silylated glycol is 2,2-dimethyl-3,6,9,12-tetraoxa-2-silatridecane.

15. The method as recited in claim 1 wherein the disilazane is a hexa-substituted disilazane selected from the group consisting of hexamethyldisilazane, 1,3-diethyl-1,1,3,3-tetramethyldisilazane, 1,3-diallyl-1,1,3,3-tetramethyldisilazane, 1,3-diphenyl-1,1,3,3-tetramethyldisilazane, and combinations thereof.

16. The method as recited in claim 1 wherein the catalyst is immobilized within the reactor.

17. The method as recited in claim 1 wherein the catalyst is present in a weight percent of between about 0.5 to about 30.

* * * * *